Dec. 15, 1959    R. C. HUNTER    2,917,064
FLUID PRESSURE TRANSMITTER WITH SQUARE ROOT CONVERTER
Filed Oct. 14, 1953    3 Sheets-Sheet 1
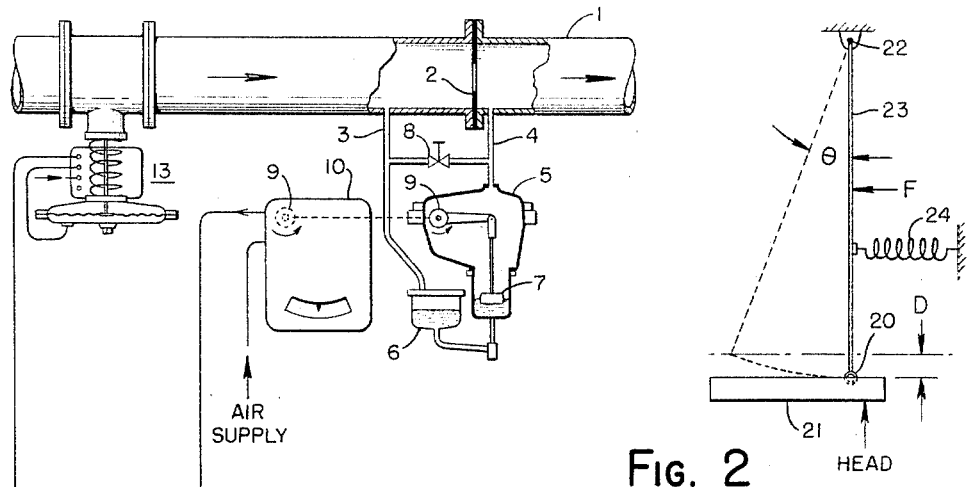
FIG. 2
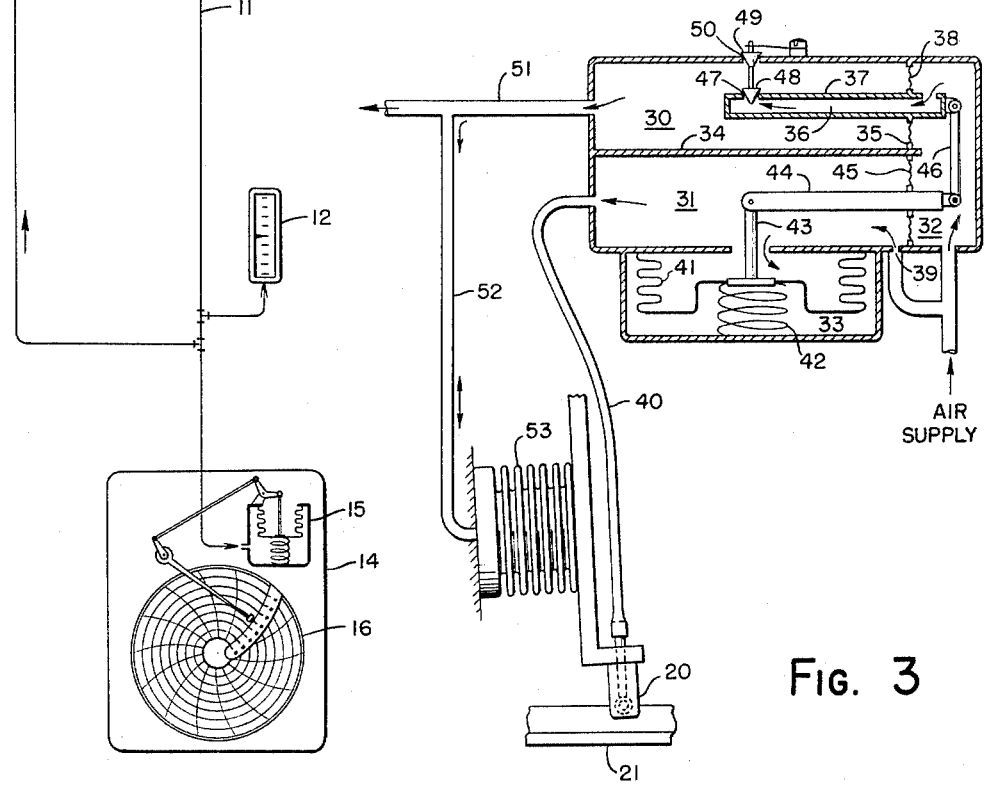
FIG. 3
FIG. 1
*INVENTOR.*
RICHARD C. HUNTER
BY Raymond D. Junkins
*ATTORNEY*

INVENTOR.
RICHARD C. HUNTER
BY
Raymond W. Junkins
ATTORNEY

INVENTOR.
RICHARD C. HUNTER
BY
Raymond D. Junkins
ATTORNEY

United States Patent Office

2,917,064
Patented Dec. 15, 1959

2,917,064

FLUID PRESSURE TRANSMITTER WITH SQUARE ROOT CONVERTER

Richard C. Hunter, Willoughby, Ohio, assignor to Bailey Meter Company, a corporation of Delaware Application October 14, 1953, Serial No. 386,060

17 Claims. (Cl. 137—85)

The present invention is directed to mechanisms for producing a linear variation of an effect representative of a non-linear variable. An immediate application for the invention has been found in those situations calling for a linear variation of a manifestation which is representative of the variations in the flow rate of a fluid.

The instrument and control industry has long utilized primary elements to restrict the flow of fluids in closed conduits in order to provide two pressures whose differences are indicated and/or recorded as the rate of flow of the fluids. Additionally, it is desirable to be able to utilize the manifestation of the rate of flow as a factor in the control of the fluid flow of a related flow or condition. However, compensation must be made for the well-known fact that the difference in pressures provided by these primary elements varies as the square of the flow of fluids through them.

It is relatively simple to place a mercury manometer across the primary element and take the vertical position of a float on the mercury, in one of the manometer legs, as representative of the value of the differential head. Also, there are differential bellows mechanisms which are adapted to respond to the head with a mechanical motion. These mechanical positions and motions may be transmitted directly, through linkage, to indicating and/or recording devices. For control effects, fluid pressure valves and relays may be actuated by the mechanical motions and positions to establish fluid pressures which are proportional to the head. However, these head values are non-linear with respect to the flow they represent, and for both observation and control purposes this manifestation is unsatisfactory.

One device, long used to deliver a linear manifestation of flow from the differential pressures, is arranged so that one of the pressures from the primary element is placed under an inverted bell which is shaped in its interior so it will be vertically displaced in position linearly with respect to flow. Another way of expressing this function is to state that the bell s shaped to extract the square root of head.

Making bells with function-extracting shapes necessitate machine operations of a highly exacting nature. Consequently, the manufacturing cost, as well as time, has militated against production of these devices. Also the uses of these devices are obviously limited. Only liquids can actuate the bell. Once formed, the bell can not be changed in shape to respond to any function other than the initial one. Finally, the maximum range of the measurement is dimensionally determined by the vertical displacement of the bell.

Flexibility is introduced into this art of obtaining linear impulses with respect to the variable by taking the non-linear motion proportional thereto into a relay which has independent means for varying the transduction of the non-linear motion into linear impulses, commonly expressed in fluid pressures. Various types of fluid pressure relay mechanisms which perform characterizing functions are known. The present invention is directed to a type of these relays termed "position-balance" mechanisms which take a non-linear impulse proportional to a function of the variable and convert it to a series of linear fluid pressures proportional to the variable.

It will serve no immediate purpose to particularly define position-balance relays, as a class, in comparison with force-balance relays. It is sufficient to recognize in these mechanisms a first half of a fluid pressure couple positioned directly with a motion which is dependent on a variable, and a structure which carries the second half of the fluid pressure couple in cooperation with the first half to produce a fluid pressure which is imposed on a pressure responsive member which moves the structure of the second half of the fluid pressure couple against a spring having a constant rate. The pressure in the pressure responsive member is then established as the output fluid pressure dependent on the motion given the first half of the fluid pressure couple. A specific structure with which to perform this function will be disclosed as embodying the present invention.

The mechanism embodying the present invention is to be specifically distinguished from those mechanisms operating on the principle illustrated in at least the application, Serial No. 353,829, filed by Harvard H. Gorrie on May 8, 1953, now Patent No. 2,884,940. The Gorrie structure takes advantage of the characteristic produced by moving a cam surface tangentially with respect to a nozzle, as representative of a fluid pressure couple. The cam surface can be shaped with respect to a single point for its rotation, to vary the relationships between the motion rotating the cam and the motion rotating the nozzle into engagement with the cam.

The system of the present invention is distinguished from the Gorrie structure by virtue of the fact here the nozzle and cam are cooperated in accordance with a trigonometric function so the cam, as the first couple half, may present a uniform, straight, cooperating surface to the nozzle, as the second coupled half. To accomplish this result, the second half of the couple is given a point about which it is rotated while the first couple half is moved toward the point of rotation while held in a plane maintained perpendicular to a radial line of the point in motions proportional to head.

If the basic motion is limited to a maximum angular range of 20° for the angle through which the second couple half is rotated, the force producing the rotation motion of the second couple half will be linear with respect to a flow whose differential pressure across a restriction to the flow moves the second coupled half. In other words, the arrangement will extract the square root of head.

One specific way of analyzing the cooperation of the couple halves would be to assume the rotated second half is a nozzle to whose back-pressure variations a pressure amplifying relay is sensitive. The output of the relay is placed in a bellows which urges the nozzle to rotate against the force of a spring of constant rate. Then, the approach of a vane to the nozzle, as the second half of the couple, will cause the nozzle to be rotated to maintain substantially constant spacing between the couple halves.

If the vane is moved toward the nozzle pivot by a linkage positioned proportionately to head, the force needed in the bellows to rotate the nozzle will vary linearly with respect to flow. The trigonometry of the movement of the vane over the distance D, illustrated in Fig. 2, as compared to the movement of the nozzle is compared in the relation of $D = 1 - \cosine\ \theta$, where the nozzle arm is arbitrarily taken as unity and values for $\theta$ are taken evenly over the range of 20°. The values for D, which are the projections of the rotating diameter on the radial line, correspond very closely to those which are produced as head moves the vane over the distance D.

It will now be appreciated that the present invention has, as a primary objective, provision of a device for establishing output impulses which have a predetermined relation of variation with input impulses.

It will be further appreciated that the present invention has as an object, the provision of a device for establishing impulses which vary linearly with the flow of fluids.

An additional object of the invention is to perform the desired function with a mechanism whose components are comparatively easy to produce on a quantity basis and whose cost compares favorably with the prior and presently available structures.

Another object is to offer a mechanism which is compact, inherently stable in performance, and easy to calibrate.

In the drawings:

Fig. 1 is a measuring system for flow in a closed conduit utilizing the present invention to give a linear manifestation.

Fig. 2 is a diagrammatic representation of the relative movements of the two halves of a fluid pressure couple in accordance with the theory of the present invention.

Fig. 3 is an elevation of a portion of the mechanism of Fig. 1 in which the invention is embodied.

Figure 4:
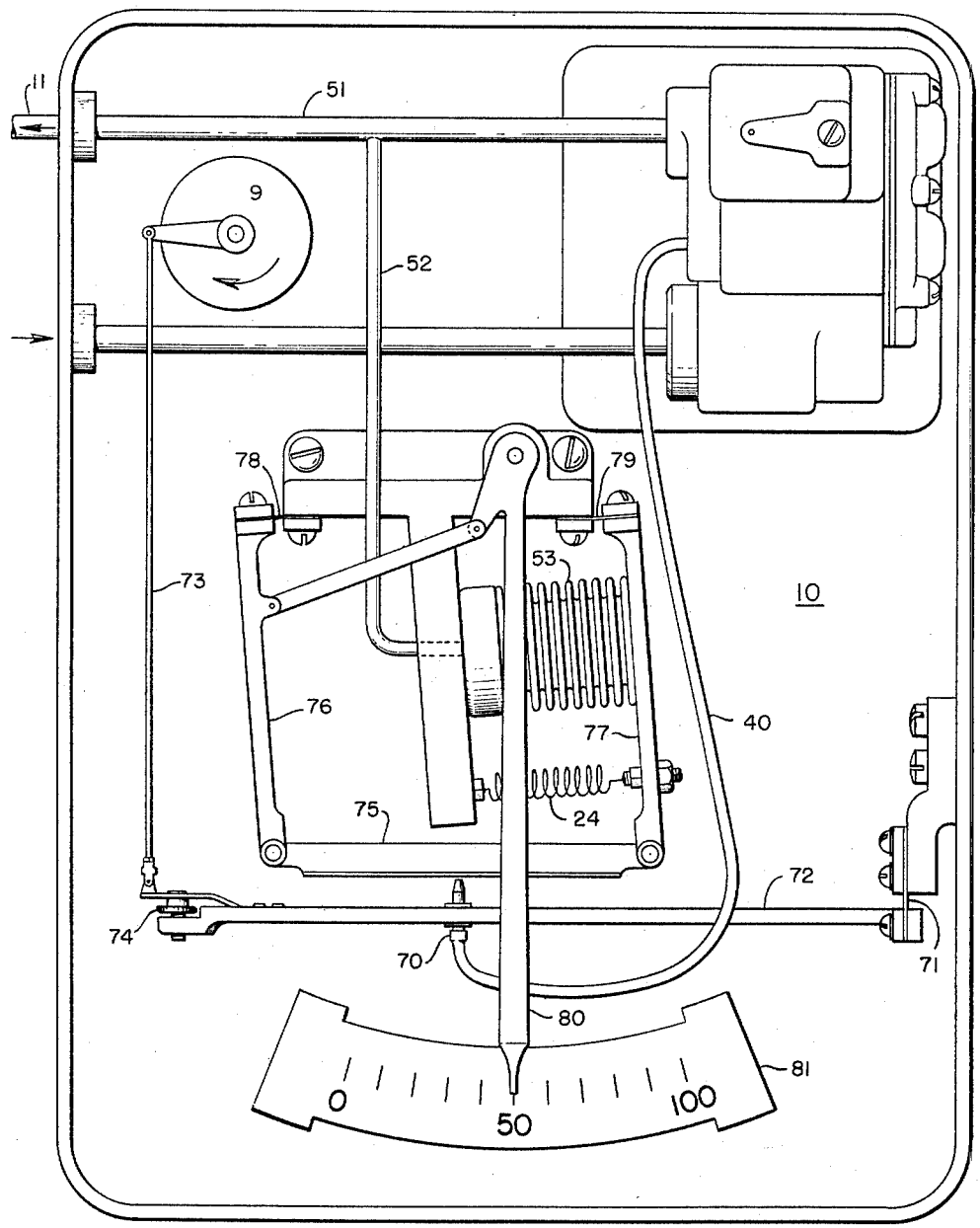
Fig. 4 is an elevation of an alternate form for the mechanism of Fig. 1 in which the invention is embodied.

Referring now to Fig. 1, conduit 1 is disclosed as containing a fluid flowing in the direction indicated by arrows. For the restrictive function indicated in the introductory remarks, orifice plate 2 is installed in fluid conduit 1. Taps 3 and 4 are then placed so that the pressures therein have a differential which is proportional to the square of the flow to fluid in conduit 1.

These pressure taps 3 and 4 are imposed upon a mercury manometer comprised of a casing 5 connected with a reservoir chamber 6. A float 7 rides on the surface of the mercury and will position vertically as the mercury level varies with the differential between the pressure in taps 3 and 4; and when valve 8 is opened the levels of mercury in casing 5 and reservoir 6 will equalize. Float 7, as it rides on the surface of the mercury in casing 5, is connected by linkage to spindle 9 which transmits the flow motion to linkage external in the casing 5.

For purposes of clarity, the structure embodying the invention, generally indicated at 10, has been disclosed as removed from, and to one side of, casing 5. As a practical matter, spindle 9 will project from casing 5 directly into 10, attached thereto. The direction of rotation of spindle 9, upon increase of flow in pipe 1, has been indicated by arrows.

The structure at 10 is to be substantially disclosed in detail. For a present application of the operation of the system, it is to be noted that the output fluid pressure of 10 is conducted with pipe 11 to remotely located indicator 12 and/or control valve 13 and/or recorder 14. The mechanism that may be found in a receiver recorder 14 has been diagrammatically illustrated as a pressure responsive bellows-spring combination 15 actuating an indicating and/or recording pen over chart 16.

It is now possible to appreciate that with a differential pressure between taps 3 and 4 established for different flow rates in pipe 1, the differential, or head, motion will have to be transduced into fluid pressures in pipe 11 which are linear with respect to the flow rates for actuation of indicating and/or recording mechanism over linear scales and charts.

With the head motion of float 7 varying in a non-linear relation to the flow actuation in pipe 1, a transmitted fluid pressure 11 is established by modifying the motion of 7 by the novel structure at 10. If the mechanism of 10, has a characterizing transducer, it can be made to establish any one of a series of relationships between motions at spindle 9 and variations of pressures in pipe 11, the invention will be appreciated as far more flexible than the specific application disclosed at Fig. 1.

With an appreciation of the problem gained from Fig. 1, attention should next be directed to Fig. 2 where an analysis is made of the basic principle utilized by the present invention. The present invention initially assumes availability of a fluid pressure couple having two main portions to be independently moved toward and away from each other so that the fluid-emitting portion will have the fluid therefrom controlled by the other portion. A simple, and practical, embodiment of this fluid couple is found in the nozzle and vane structure well-known in the fluid pressure control art. A diagrammatic nozzle 20 is shown cooperating with a vane 21 in Fig. 2.

To illustrate the cooperation of the nozzle and vane, nozzle 20 is given a pivot 22. The nozzle-carrying arm 23 swings nozzle 20 about pivot 22 and through a predetermined arcuate path having a center of curvature at 22 under the direction of two forces, a force of constant-rate variation and a force which the invention causes to vary linearly with respect to flow thru a closed conduit. The unbalance in these two forces swings nozzle-carrying arm 23 through an angle $\theta$ while vane 21 traverses a distance D toward pivot point 22 substantially parallel to a radial line of the arcuate path of nozzle 20.

It has been discovered, by the applicant, that if vane 21 is maintained substantially horizontal while moved over distance D in increments proportional to head, or the square of flow, force F will vary substantially linearly over its range required to move nozzle 20 along an arc whose radius goes through angle $\theta$ against the constant-rate force of a spring 24. This can be shown mathematically by comparing the projections along the vertical radial line, along which arm 23 is lying in Fig. 2, of nozzle 20, to the head movement of vane 21 over distance D. The projections on the radial line, over the distance D, are equal to 1-cosine $\theta$, if the length of arm 23 is taken as unity.

If a calculation is made for D at each two degrees of rotation of arm 23 over a total $\theta$ of 20° it will be observed that the motion varies less than one quarter of one percent from square root motion.

| Angle | Square Root Motion | D = 1-Cosine $\theta$ |
|---|---|---|
| 1 | .0001507 | .00015 |
| 2 | .000603 | .00061 |
| 4 | .002412 | .00244 |
| 6 | .005427 | .00548 |
| 8 | .009648 | .00973 |
| 10 | .015075 | .01519 |
| 12 | .021708 | .02185 |
| 14 | .029547 | .02971 |
| 16 | .038592 | .03874 |
| 18 | .048843 | .04894 |
| 20 | .060300 | .06030 |

The present applicant observed this relationship and evolved a structure to utilize it, as diagrammatically depicted in Fig. 2, which is simple, efficient, easy to calibrate, in short, which attains all the objects of the present invention.

Before proceeding to disclose comprehensive embodiments of the invention, it would be advantageous to understand a form of generic, fluid pressure amplifier, necessary to all the embodiments. Such an amplifying mechanism is disclosed in Fig. 3, responsive to a specific form of nozzle in establishment of an output which is impressed upon a bellows member to set the value of F for pivoting the nozzle about its pivot.

The relay, or amplifier, structure of Fig. 3 has been generally disclosed and claimed in an application Serial No. 289,402, filed May 22, 1952, by Harvard H. Gorrie and Jack F. Shannon, now Patent 2,737,963. As in the Gorrie et al. application, the nozzle-half of the pneumatic couple is arranged to vary the internal pressure of the large bellows in the relay in order to control the output. The casing is divided into four main chambers 30—33; chambers 30 and 31 are separated by a wall 34 while chamber 32 is separated from chambers 30 and 31 by a wall or partition generally indicated at 35. Air, under the supply pressure, is available in chamber 32, in the passage 36 of a tubular arm 37 which is pivoted through a flexible diaphragm 38 inserted in the wall 35, and chamber 31 through a fixed orifice 39. The orifice is sized to allow a flow into the chamber 31 at a rate which is substantially constant under normal pressure conditions within the chamber 31.

The chamber 31 communicates with the nozzle 20 by means of flexible connection 40. Bellows 41 is loaded by a spring 42. The movable wall of the bellows 41 is arranged to position a push-rod 43 in chamber 31 to angularly move an arm 44 about its pivot diaphragm 45 located in the wall 35 in alignment with the pivot sealing diaphragm 38. The other end of the arm 44 is pivoted to a link 46 (in chamber 32) and the other end of link 46 is pivotally connected to an end of tubular arm 37. It will thus be seen that an upward movement of rod 43 will result in a clockwise (cw.) movement of rod 44 about its pivot diaphragm 45, downward movement of link 46, and cw. movement of tubular arm 37 about its pivot diaphragm 38; the angular movement of members 44 and 37 being substantially equal and in the same direction. Downward movement of rod 43 results in counter clockwise (ccw.) movement of members 44 and 37.

Movement of arm 37 ccw. from the position shown in Fig. 3 results in the valve seat 47 moving away from valve 48 to admit air from chamber 32, into the interior of chamber 30. Movement of arm 37 upwardly from the position shown in Fig. 3 retains the valve 48 seated on 47 but lifts exhaust valve 49 from its seat 50 to allow air from chamber 30 to bleed to the atmosphere. Thus the angular positioning of arm 37, about its pivot diaphragm 38, controls the supply of pressure air to chamber 30 and the bleed of air therefrom. A range in pressure in chamber 30 may vary from atmosphere pressure up to supply pressure. The resultant, or output pressuref of the relay, available in chamber 30, is imposed on the output pipe 51 and pipe 52 going to bellows 53 in determination of F.

More detailed explanation of the function and limits of the relay, or amplifier, is set forth in the application by Gorrie et al. It is important here to note only that the arrangement of this structure is generally as disclosed in the Gorrie et al. application and all the advantages of large amplification and sensitivity are utilized to good advantage in the present invention.

Turning now to Fig. 4, a comprehensive, practical embodiment of the present invention is disclosed as capable of functioning as transmitter 10 of Fig. 1. There are, perhaps, certain difficult problems encountered in this arrangement, but the principle of operation is given a clear illustration with this structure. The more practical forms embodying the invention will be the more easily understood after this device is studied.

First note that the spindle 9 is given a direction of rotation opposite to that in Fig. 1. Either direction is feasible, but it is somewhat more convenient to give the spindle 9 a cw. rotation in Fig. 4 so the linkage therefrom will easily clear the other mechanism of the transmitter which converts the non-linear head motion into linear fluid pressure impulses.

A further fact to be initially taken into account is that the fluid pressure couple, comprised of a nozzle and vane, are reversed, in their relative motions, to those depicted in Figs. 2 and 3. However, the results obtained are the same, and this embodiment of Fig. 4 serves to illustrate the generic nature of the principle that either couple half can be effectively rotated about a point while the other couple half traces a path which is substantially a radial line of the pivot point, or parallel to such line.

Assuming, for the purposes of orientation with the disclosure of Fig. 4, that nozzle 70 is to be moved substantially along a vertical line. The total length of this path is so small that a single pivot point 71 with a long radius is practical, for simplicity. Nozzle arm 72 carries nozzle 70 and is rotated about hinge pivot 71 by link 73 which is joined to arm 72 through an adjustment determined by manipulation of screw 74. The nozzle 70 can, therefore, be given an initial adjustment relative to the vane and rotation of spindle 9.

Vane 75 can now be considered in its movement to follow nozzle 70. It is obvious that if vane 75 is to offer a flat, horizontal surface to nozzle 70 while moving about a pivotal point, linkage which is effectively a parallelogram will have to be utilized. Arms 76 and 77, pivoted at 78 and 79, provide this arrangement. Either arm 76 or arm 77 may be regarded as the arm analogous to arm 23 of Fig. 2. Vane 75 is carried up along distance D (refer to Fig. 2) as the arms pivot about their hinge pivots 78 and 79 by a force which is linear with respect to flow.

The linear force positioning vane 75 comes from the same structure delineated in Fig. 3 and generalized in Fig. 2. Bellows 53 is responsive to the output of the booster relay, through conduit 52, against the force of spring 24. Nozzle 70 regulates the input to the relay through flexible connection 40, as before.

Finally, it is evident that a simple linkage connection between arm 76 and pointer 80 will provide a linear indication of the value of the measured variable on scale 81. As the pressures in bellows 53 are linear in acting against a constant rate of resistance in spring 24, arm 76 will be swung about pivot 78 through angles proportional to the fluid pressures in bellows 53.

Figures 5, 5A:
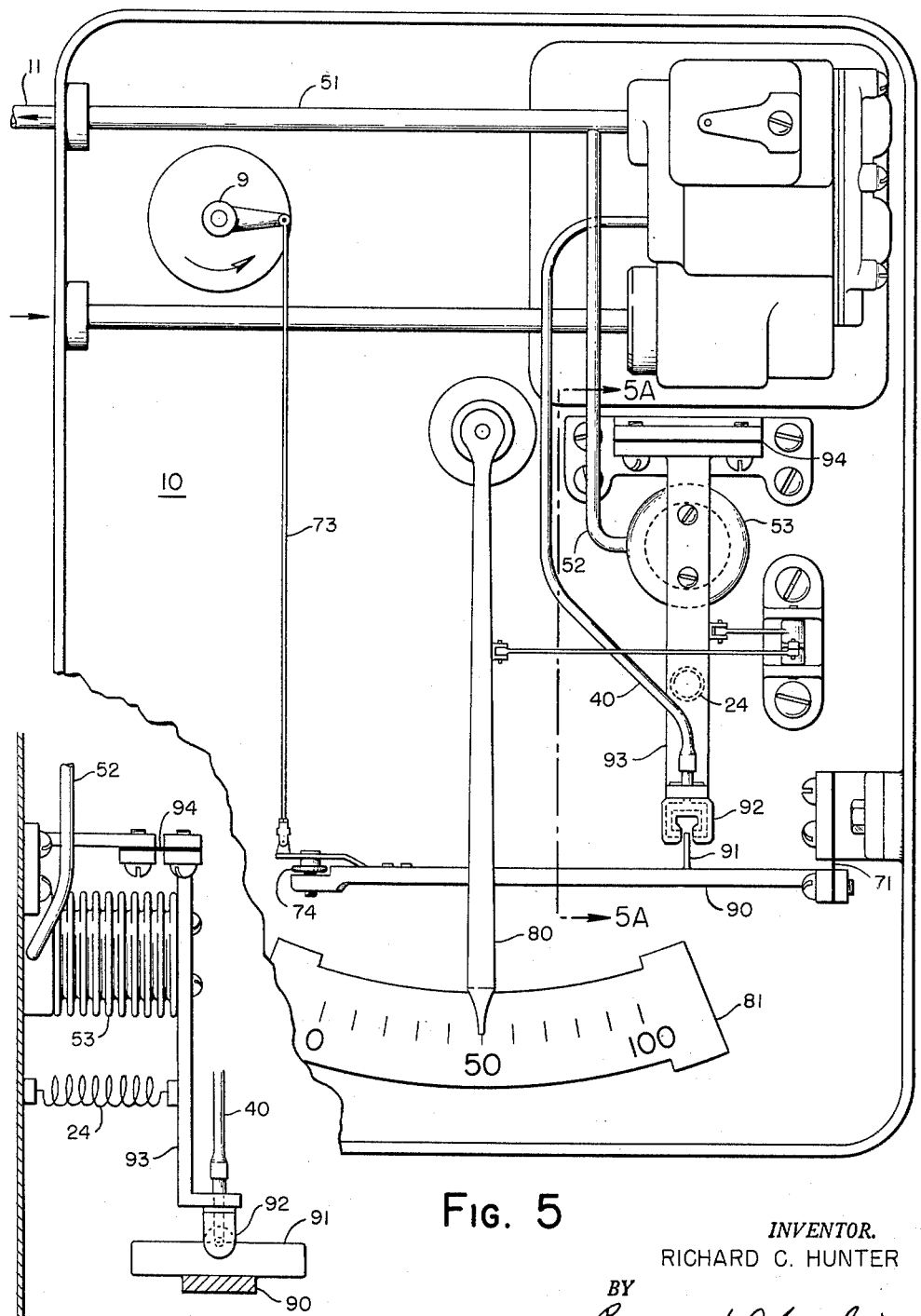
Fig. 5 is an elevation of a further alternate form for the mechanism of Fig. 1 in which the invention is embodied.
Fig. 5A is a view taken along the line 5A—5A of Fig. 5 in the direction of the arrows.

Turning next to Fig. 5, another comprehensive practical embodiment of the present invention is disclosed as capable of functioning as transmitter 10 of Fig. 1. The principle utilized by this mechanism is identical with that utilized in the mechanism of Fig. 4 and demonstrated in Fig. 2. In certain features this embodiment approaches more closely the final, commercial embodiment conceived. The fluid pressure couple is given a more simple form than that disclosed in Fig. 4.

First note that the spindle 9 is given a direction of rotation identical with that in Fig. 1. Here again it is feasible to rotate spindle 9 in either direction. A ccw. rotation was selected to contrast with the alternate direction of Fig. 4 and emphasize that this is not a limitation in the present invention.

Hinge pivot 71, link 73 and adjustment 74 remain the same in form and function as in Fig. 4. The arm pivoted about 71 will now be designated as 90 because in this embodiment this arm carries the vane half of the couple instead of the nozzle half. Vane 91 is distinctive from any specific form considered heretofore in that its nozzle-cooperating edge is maintained horizontal through the angle arm 90 moves as it pivots about 71. Therefore, in the elevation of Fig. 5, vane 91 is observed along its horizontal edge. Of course, pivoting arm 90 about hinge 71 will remove vane 91 or first couple half from the plane in which it is observed in Fig. 5. However, the angular movement, which is toward a plane containing the hinge pivot axis 71, is kept so small that this degree of removal is easily compensated.

With the foregoing arrangement of a vane edge held horizontal and moved substantially along a vertical line, it has been found feasible to rotate a nozzle form 92 in the plane of the vane, that is, in a plane 90° to the plane in which vane arm 90 rotates. Nozzle form, or second couple half, 92 is comprised of two, opposed nozzle openings with which vane 91 cooperates by sliding between them. This form of fluid pressure couple is old in the art but found to have desirable stability and sensitivity. The nozzle arm 93 is pivoted from a hinge pivot 94 and has its rotation controlled by the force of by now-familiar bellows 53 and spring 24.

The fact that vane arm 90 and nozzle arm 93 are rotating in planes 90° to each other does not alter the fact that the principle illustrated in Fig. 2 is utilized to obtain linear fluid pressures in output pipe 51 conduit 52 and bellows 53. When spindle 9 rotates under the direction of a head meter, vane 91 is moved up or down along distance D (Fig. 2) proportional thereto and substantially along a radial line of a hinge pivot 94 about which is rotated the nozzle 92 cooperating with the edge of the vane. The movement precisely follows the principle illustrated in Fig. 2. The only fact that need be kept in mind is that the vane 91 is moved over the distance D by the pivoted arm 90 aligned with an observer of Fig. 2. As long as the angle of rotation is maintained sufficiently small, the distance between the opposed nozzle openings may be wide enough to accommodate the deviation from the vertical experienced by the vane 91.

Flexible connection 40 allows the nozzle form 92 to control the booster relay of Fig. 3 exactly as in the preceeding embodiment, and pointer 80 is given simple linkage to nozzle arm 93 in order to move the pointer over the equal calibrations of scale 81.

What I claim as new, and desire to secure by Letters Patent of the United States, is:

1. A mechanism for producing fluid pressures over a linear range, including, a fluid pressure couple comprised of two halves, first linkage moving a first half of the couple toward a pivot axis therefor and over a radial distance in proportion to the differential in pressure across a fluid flow restriction, second linkage causing the second half of the couple to rotate about another pivot axis having a substantially right angle relationship with the first pivot axis to maintain a substantially constant distance from the first half of the couple, fluid pressure amplifying means responsive to the couple output and establishing a fluid pressure proportional thereto, expansible chamber means responsive to the output established by the fluid pressure amplifying means for acting on the second linkage to rotate the second half of the couple in maintaining the distance from the first half couple, and resilient means opposing the movement of the second linkage by the expansible chamber means with a force of constant rate variation.

2. The mechanism of claim 1 wherein the couple is a vane and nozzle combination.

3. The mechanism of claim 2 wherein the vane is the first couple half and the nozzle is rotated about the pivot axis.

4. The mechanism of claim 3 wherein the means positioning the vane moves the vane towards the pivot axis of the nozzle while maintaining the vane at an angle substantially constant to a line extending from said pivot axis through the axis of the nozzle.

5. The mechanism of claim 4 wherein the means positioning the nozzle is a bellows exerting its force on the link between the pivot point and nozzle.

6. The mechanism of claim 5 wherein the resilient means is a spring exerting its constant rate force on the link between the pivot point and nozzle.

7. The mechanism of claim 2 wherein the nozzle is the first couple half and the vane is rotated about the pivot.

8. The mechanism of claim 7 wherein the vane is moved toward and from the vane pivot while held in a plane maintained at a constant angle to a plane through the pivot.

9. The mechanism of claim 8 wherein the means positioning the vane is a bellows acting on the vane linkage.

10. The mechanism of claim 9 wherein the resilient means is a spring acting on the vane linkage.

11. A mechanism for producing fluid pressures over a linear range and including a fluid pressure couple composed of a first half and a second half; a first linkage having a hinge pivot about which a member of the first linkage rotates and carries the first couple half toward a plane containing the hinge pivot axis; a second linkage having a hinge pivot extending at a right angle to the hinge pivot of the first linkage and about which a member of the second linkage rotates and moves the second couple half relative to the first couple half in accordance with variations in differentials of fluid flow pressure; fluid pressure amplifying means responsive to fluid pressure couple output establishing a fluid pressure proportional thereto; and expansible chamber means responsive to the output pressure of the fluid pressure amplifying means and joined in actuating relation with the linkage member carrying the first couple half relatively to position said couple halves in accordance with differentials of fluid flow pressures.

12. The mechanism of claim 11 in which the first half of the fluid pressure couple is a vane and the second half of the fluid pressure couple is a nozzle, and resilient means of constant rate variation opposes expanding movement of the expansible chamber.

13. A mechanism for producing fluid pressures over a linear range, comprising a fluid pressure couple having a first couple half and a second couple half, a first linkage for rotating the first couple half about a first pivot axis, a second linkage for moving the second couple half about a second pivot axis having a substantially right angle relationship with the first pivot axis, means responsive to a change in a variable for actuating the second linkage to effect movement of the second couple half and a variation in the spacing between the two couple halves, means responsive to the variation in spacing between the two couple halves for establishing a fluid output pressure, and means responsive to the output pressure for actuating the first linkage to move the first couple half and restore the spacing between the two couple halves, the restoring motion of the first couple half having a mathematical relationship with the motion of the first couple half which is a function of the right angle relationship of the first axis and the second axis.

14. A mechanism for producing fluid pressures over a linear range, comprising a fluid pressure couple having a couple half movable in an arcuate path of predetermined length about a pivot axis defining the center of curvature of the arcuate path and an opposing couple half movable substantially parallel to a radial line of the arcuate path in a path having a predetermined angular relationship with the arcuate path, means responsive to a variable for effecting movement of one of the couple halves relative to the other to vary the spacing therebetween, means responsive to the variation in spacing for establishing a fluid pressure, and means responsive to the fluid pressure established by the last said means for effecting movement of the other couple half to restore the spacing, the restoring motion of the other couple half having a mathematical relationship with the motion of the one couple half which is a function of the angular relationship of the paths.

15. A fluid pressure couple comprising a first couple half movable in an arcuate path of predetermined length about a pivot axis defining the center of curvature of the arcuate path, and an opposing couple half movable substantially parallel to a radial line of the arcuate path of the first couple half in a path having a predetermined angular relationship with the arcuate path of the first couple half, the motion of the opposing couple half having a mathematical relationship with the motion of the first couple half which is a function of the angular relationship of the arcuate path of the first couple half and the path of the opposing couple half.

16. A fluid pressure couple comprising a first couple half adapted to be moved in an arcuate path of predetermined length about a pivot axis defining the center of curvature of the arcuate path, a second couple half movable substantially parallel to a radial line of the arcuate path of the first couple half in a path having a predetermined angular relationship with the arcuate path of the first couple half, means for moving the second couple half to vary the spacing between the two halves, means for moving the first couple half to restore the spacing, the movement of the second half having approximately a square root relationship with the movement of the first half.

17. A mechanism for producing a signal over a linear range, comprising, a first couple half rotatable about a first axis, a second couple half spaced from the first half and rotatable about a second axis having a predetermined angular relationship with the first axis, a first linkage for moving the first couple half about the first axis in response to variations in the magnitude of a variable to vary the spacing between the couple halves, means responsive to the variation in spacing between the couple halves for establishing an output signal, and means responsive to the output signal for actuating the second couple half to restore the spacing between the two couple halves, the restoring motion of the second couple half having a mathematical relationship with the motion of the first couple half which is a function of the angular relationship of the first axis and second axis.

References Cited in the file of this patent

UNITED STATES PATENTS

| | | |
|---|---|---|
| 1,509,695 | Volet | Sept. 23, 1924 |
| 2,170,418 | Mabey | Aug. 22, 1939 |
| 2,354,423 | Rosenberger | July 25, 1944 |
| 2,387,075 | Johnson | Oct. 16, 1945 |
| 2,408,685 | Rosenberger | Oct. 1, 1946 |
| 2,697,351 | Dickey | Dec. 21, 1954 |

FOREIGN PATENTS

| | | |
|---|---|---|
| 1,039,092 | France | Mar. 13, 1953 |